United States Patent
Xiong et al.

(10) Patent No.: US 9,318,967 B2
(45) Date of Patent: Apr. 19, 2016

(54) DC TO DC CONVERTER AND DC TO DC CONVERSION SYSTEM

(71) Applicant: DELTA ELECTRONICS (SHANGHAI) CO., LTD., Shanghai (CN)

(72) Inventors: Yahong Xiong, Shanghai (CN); Zhongwang Yang, Shanghai (CN); Qiong Zhang, Shanghai (CN); Guisong Huang, Shanghai (CN)

(73) Assignee: DELTA ELECTRONICS (SHANGHAI) CO., LTD. (CN)

( * ) Notice: Subject to any disclaimer, the term of this patent is extended or adjusted under 35 U.S.C. 154(b) by 0 days.

(21) Appl. No.: 14/611,695

(22) Filed: Feb. 2, 2015

(65) Prior Publication Data

US 2015/0249395 A1 Sep. 3, 2015

(30) Foreign Application Priority Data

Feb. 28, 2014 (CN) .......................... 2014 1 0073174

(51) Int. Cl.
*H02M 3/335* (2006.01)
*H02M 3/158* (2006.01)
(Continued)

(52) U.S. Cl.
CPC ........ *H02M 3/33546* (2013.01); *H02M 3/1584* (2013.01); *H02M 3/337* (2013.01);
(Continued)

(58) Field of Classification Search
CPC .......... H02M 3/33546; H02M 3/1584; H02M 3/157; H02M 2001/0054; H02M 2001/007; H02M 2003/158; H02M 3/33592; H02M 3/337; Y02B 70/1475

USPC .............................. 363/21.06, 15–17, 22–24; 323/311–317, 282, 283
See application file for complete search history.

(56) References Cited

U.S. PATENT DOCUMENTS 6,067,241 A * 5/2000 Lu .................................. 363/65
2003/0142513 A1* 7/2003 Vinciarelli ...................... 363/17
(Continued)

FOREIGN PATENT DOCUMENTS

CN 1843677 10/2006
CN 101221850 7/2008
(Continued)

OTHER PUBLICATIONS

Office Action dated Oct. 9, 2015 from corresponding No. CN 201410073174.0.

*Primary Examiner* — Jessica Han
*Assistant Examiner* — Demetries A Gibson
(74) *Attorney, Agent, or Firm* — Hauptman Ham, LLP

(57) ABSTRACT

The present disclosure discloses a DC/DC converter and a DC/DC conversion system. The DC/DC converter includes a transformer, a primary power circuit, a secondary bridge synchronous rectifying circuit, an output inductor and a control circuit. The primary power circuit receives an input voltage, and deliver a symmetrical power flow to a secondary side of the transformer during positive and negative switching cycles, and a magnetic flux in the transformer core is balanced through the above symmetrical power flow. The rectifying circuit is coupled to a secondary winding of the transformer. The control circuit provides primary and secondary driving signals to the primary power circuit and the rectifying circuit, respectively. When an output voltage of the primary power circuit is zero, the control circuit controls the first, the second, the third and the fourth switches to be conductive.

21 Claims, 13 Drawing Sheets

(51) Int. Cl.
  *H02M 3/337*   (2006.01)
  *H02M 1/00*   (2007.01)

(52) U.S. Cl.
  CPC .... *H02M3/33592* (2013.01); *H02M 2001/007* (2013.01); *H02M 2001/0054* (2013.01); *H02M 2003/1586* (2013.01); *Y02B 70/1475* (2013.01)

(56) References Cited

U.S. PATENT DOCUMENTS

| | | | |
|---|---|---|---|
| 2005/0068792 A1* | 3/2005 | Yasumura | 363/21.06 |
| 2005/0212640 A1* | 9/2005 | Chiang et al. | 336/200 |
| 2008/0211304 A1* | 9/2008 | Farrington et al. | 307/31 |
| 2011/0038189 A1* | 2/2011 | Whittam et al. | 363/84 |
| 2012/0063184 A1* | 3/2012 | Mazumder | 363/98 |
| 2012/0081927 A1* | 4/2012 | Matsumoto | 363/21.05 |
| 2013/0265804 A1 | 10/2013 | Fu et al. | |
| 2014/0063859 A1* | 3/2014 | Jin et al. | 363/17 |
| 2014/0268903 A1* | 9/2014 | Reiter et al. | 363/21.02 |

FOREIGN PATENT DOCUMENTS

| | | |
|---|---|---|
| CN | 101521464 | 9/2009 |
| CN | 101675488 | 3/2010 |
| CN | 202261027 | 5/2012 |
| CN | 1391720 | 7/2012 |
| CN | 103532390 | 1/2014 |
| JP | 2013110786 | 6/2013 |

\* cited by examiner

DC TO DC CONVERTER AND DC TO DC CONVERSION SYSTEM

CROSS-REFERENCE TO RELATED APPLICATIONS

This application is based on and claims priority from Chinese Patent Application No. 201410073174.0, filed on Feb. 28, 2014, the entire contents of which are incorporated herein by reference.

TECHNICAL FIELD

The present disclosure relates generally to a direct current to direct current (DC to DC) converter and a DC to DC conversion system. More particularly, the present disclosure relates to an intermediate bus converter (IBC) having an improved circuit design and configuration to achieve a higher power conversion efficiency and a higher power density, and a DC to DC conversion system including the intermediate bus converter.

BACKGROUND

The intermediate bus power architecture is widely used in electronics devices to provide multiple output voltages (for example, 3.3V, 1.8V, 1.2V) from a centralized input voltage (for example, 48V), to achieve a flexibility of designing the power system, and to overall enhance a power conversion efficiency. As shown in FIG. 1, an isolated DC to DC converter, called the intermediate bus converter, is employed to convert the input voltage to a low voltage, and then a non-isolated DC to DC converter provides multiple output voltages for satisfying various requirements of the system based on the converted low voltage.

Most of the intermediate bus converters are installed on a system board of the user. There are a variety of user systems such as network systems, computer systems, server systems, and communication systems. Such converters are integrated with a master power switch, a synchronous rectifier, a transformer, an inductor, etc., wherein the master power switch and the synchronous rectifier are installed on one main PCB board. The magnetic cores respectively from the front surface and the back surface of the PCB board are clasped so as to constitute the transformer together with the PCB winding, and the magnetic cores of an inductor are installed to constitute the inductor in a similar manner. Since all the power flow will pass through the intermediate bus converter, the efficiency and power density of the intermediate bus converter is particularly important for improving the overall power system efficiency and optimizing the system thermal design. For the isolated DC to DC converter, the power loss may come from several reasons: primary switch loss including switching loss and conduction loss, transformer power loss including magnetic core loss, winding loss and leakage inductance loss, and secondary rectifier power loss including conduction loss and reverse recovery loss. Moreover, the power loss of the body diode of the synchronous rectifier usually significantly impacts the efficiency of the converter due to its poor reverse recovery characteristic.

In order to improve the efficiency of the converter, the designer may keep the balance of the above power loss portions, and keep the total amount of power loss as low as possible. There are several solutions to reduce the power loss of the intermediate bus converter. The first solution is employing a resonant converter, as shown in FIG. 2, the circuit topology of which includes primary switches S11 and S12; primary capacitors C1, C2 and C3; a primary inductor L1; a transformer T; secondary synchronous rectifiers S21 and S22; and a secondary capacitor C4. The resonant topology keeps the primary switches S11 and S12, and the secondary synchronous rectifiers S21 and S22 operating in a soft switching condition, so the primary switching loss and secondary reverse recovery loss will be eliminated. And the resonant topology may use a lower voltage rating synchronous rectifier in the secondary side of the transformer because it is not necessary to configure the output inductor, which ensures the continuous output current in the PWM converter. However, the resonant topology will cause a high RMS current both in the primary side and the secondary side, and result in high conduction loss. Another issue of the resonant converter is that the large output current ripple may cause voltage fluctuation if the capacitance value of the output capacitor is not enough. Therefore, it is not a good choice if we need take more consideration on the output current ripple.

For the PWM intermediate bus converter, one method to improve the efficiency is removing the regulation function, as shown in FIG. 3. The converter without regulation, usually called non-regulated converter, operates in a fixed duty cycle, which is close to 50%. In addition, both peak current and RMS current in the primary switches are reduced, and both conduction loss and switching loss of the primary switches are reduced accordingly. Also, due to the above fixed duty cycle, the voltage stress of the synchronous rectifiers is reduced, so the lower voltage rating synchronous rectifier may be used. The conduction loss and reverse recovery loss of the synchronous rectifiers are both reduced since the lower voltage switches usually have a lower on-resistance and better reverse recovery characteristic. However, in the related art, in order to keep the minimized switch loss in the secondary current loop, two secondary transformer windings are usually adopted, and the two secondary windings conduct the current alternatively in the positive and negative switching cycles, as shown in FIG. 3. Although the conduction loss of the synchronous rectifiers is reduced due to only one switch in the secondary current loop, the power loss in the transformer winding is still high since the two secondary windings conduct current sequentially and alternatively. In this way, the utilization rate of the transformer secondary windings is relatively low, and the conducting impedance and the conducting loss of the transformer secondary windings are very high. In addition, the two secondary windings need three high current terminals, and the power loss from current terminals is relatively high.

In general, the non-regulated converter is only used in a narrow input voltage system, since the output voltage varies with the proportion of the input voltage. Once the input voltage range becomes wider, or the non-isolated DC to DC stage can't tolerate a wider input range, the regulation in the intermediate bus converter is still expected. Therefore, an improved circuit design and configuration to achieve higher power conversion efficiency is desired for both the regulated converter and the non-regulated converter.

The information described above is only used to enhance the understanding of the background of the present disclosure, and thus may include the information which is not regarded as the ordinary skill in the art for the person skilled in the art.

SUMMARY

One object therefore in the present disclosure is to provide a new DC to DC converter configuration and design and configuration method thereof.

Another objects, features and benefits in the present disclosure can be became apparent by the following description, or partially understood by implementing the present disclosure.

According to an aspect of the present disclosure, there is provided a DC to DC converter, including a transformer, a primary power circuit, a secondary bridge synchronous rectifying circuit, an output inductor and a control circuit; wherein the transformer has a transformer core, a primary winding and a secondary winding, the primary winding is electrically coupled to an output terminal of the primary power circuit; the primary power circuit is configured to receive an input voltage, and implement a process of delivering a symmetrical power flow to a secondary side of the transformer during a positive switching cycle and a negative switching cycle which are symmetrical, a magnetic flux in the transformer core is balanced through the process of delivering the symmetrical power flow; the secondary bridge synchronous rectifying circuit is electrically coupled to the secondary winding of the transformer, and includes: a first switch having a first end electrically coupled to one end of the output inductor, and a second end electrically coupled to a first end of the secondary winding; a second switch having a first end electrically coupled to the second end of the first switch; a third switch having a first end electrically coupled to the first end of the first switch, and a second end electrically coupled to a second end of the secondary winding; and a fourth switch having a first end electrically coupled to the second end of the third switch, and a second end electrically coupled to a second end of the second switch; and the control circuit is configured to provide a primary driving signal and a secondary driving signal to the primary power circuit and the secondary bridge synchronous rectifying circuit, respectively, and when an output voltage of the primary power circuit is zero, the control circuit is configured to control the first switch, the second switch, the third switch and the fourth switch to be conductive.

According to another aspect of the present disclosure, there is provided a DC to DC conversion system, including: a DC to DC converter including a transformer, a primary power circuit, a secondary bridge synchronous rectifying circuit, an output inductor and a control circuit, wherein the transformer has a transformer core, a primary winding and a secondary winding, the primary winding is electrically coupled to the primary power circuit; the primary power circuit is configured to receive an input voltage, and implement a process of delivering a symmetrical power flow to a secondary side of the transformer during a positive switching cycle and a negative switching cycle which are symmetrical, a magnetic flux in the transformer core is balanced through the process of delivering the symmetrical power flow; the secondary bridge synchronous rectifying circuit is electrically coupled to the secondary winding of the transformer, and includes: a first switch having a first end electrically coupled to one end of the output inductor, and a second end electrically coupled to a first end of the secondary winding; a second switch having a first end electrically coupled to the second end of the first switch; a third switch having a first end electrically coupled to the first end of the first switch, and a second end electrically coupled to a second end of the secondary winding; and a fourth switch having a first end electrically coupled to the second end of the third switch, and a second end electrically coupled to a second end of the second switch; and the control circuit is configured to provide a primary driving signal and a secondary driving signal to the primary power circuit and the secondary bridge synchronous rectifying circuit, respectively, and when an output voltage of the primary power circuit is zero, the control circuit is configured to control the first switch, the second switch, the third switch and the fourth switch to be conductive; and a non-isolated switching regulator electrically coupled to an output terminal of the DC to DC converter, and configured to convert the input voltage of the DC to DC converter into one or more regulated voltages.

According to another aspect of the present disclosure, there is provided a DC to DC conversion system, including: a DC to DC converter including a transformer, a primary power circuit, a secondary bridge synchronous rectifying circuit, an output inductor and a control circuit, wherein the transformer has a transformer core, a primary winding and a secondary winding, the primary winding is electrically coupled to the primary power circuit; the primary power circuit is configured to receive an input voltage, and implement a process of delivering a symmetrical power flow to a secondary side of the transformer during a positive switching cycle and a negative switching cycle which are symmetrical, a magnetic flux in the transformer core is balanced through the process of delivering the symmetrical power flow; the secondary bridge synchronous rectifying circuit is electrically coupled to the secondary winding of the transformer, and includes: a first switch having a first end electrically coupled to one end of the output inductor, and a second end electrically coupled to a first end of the secondary winding; a second switch having a first end electrically coupled to the second end of the first switch; a third switch having a first end electrically coupled to the first end of the first switch, and a second end electrically coupled to a second end of the secondary winding; and a fourth switch having a first end electrically coupled to the second end of the third switch, and a second end electrically coupled to a second end of the second switch; and the control circuit is configured to provide a primary driving signal and a secondary driving signal to the primary power circuit and the secondary bridge synchronous rectifying circuit, respectively, and when an output voltage of the primary power circuit is zero, the control circuit is configured to control the first switch, the second switch, the third switch and the fourth switch to be conductive. The DC to DC conversion system further includes a non-isolated switching regulator electrically coupled to an input terminal of the DC to DC converter.

Since a lower voltage rating MOSFET can be used in the synchronous rectifier, the leakage inductance can be minimized as low as possible. Even facing a high current variation di/dt, the lower voltage rating MOSFET will not cause a large power loss. As a result, the transformer windings may be coupled perfectly. The power loss will be reduced once the leakage inductance between the primary winding and secondary winding is minimized.

In the PCB transformer layout, the terminal of the winding usually causes a large power loss, especially for the secondary winding carrying a higher current. Using the winding configuration described above, only two secondary winding terminals may be remained, thereby it is possible to further optimize the transformer structure to obtain higher conversion efficiency.

With regard to a concern with the thermal design, it is easier to deal with the power consumption in the power devices than in the PCB windings. By the power configuration and the timing control described in the present disclosure, the transformer winding loss will be reduced and the overall conversion efficiency of the converter can be improved for either regulated operation mode or non-regulated operation mode.

The above and other features and advantages of the present disclosure will become apparent for the person skilled in the art after having read the following detailed description of the exemplary embodiments in the drawings.

DETAILED DESCRIPTION

Figure 1:
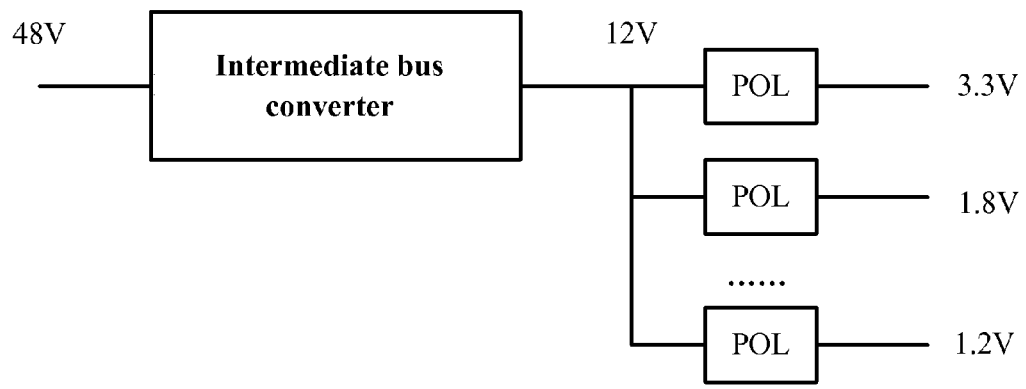
FIG. 1 shows a block diagram of a power system with intermediate power architecture.
Figure 2:
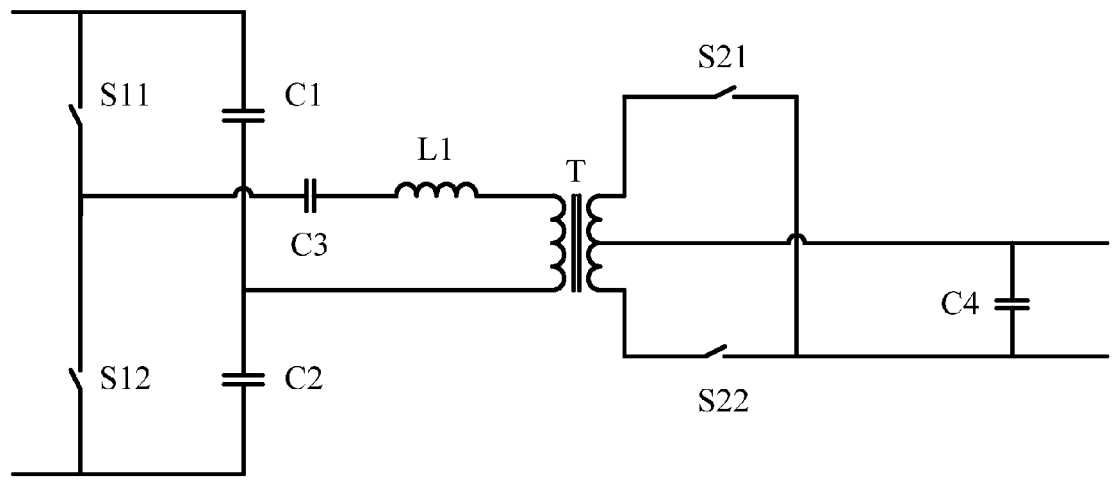
FIG. 2 shows a schematic circuit diagram of a resonant converter in the related art.
Figure 3:
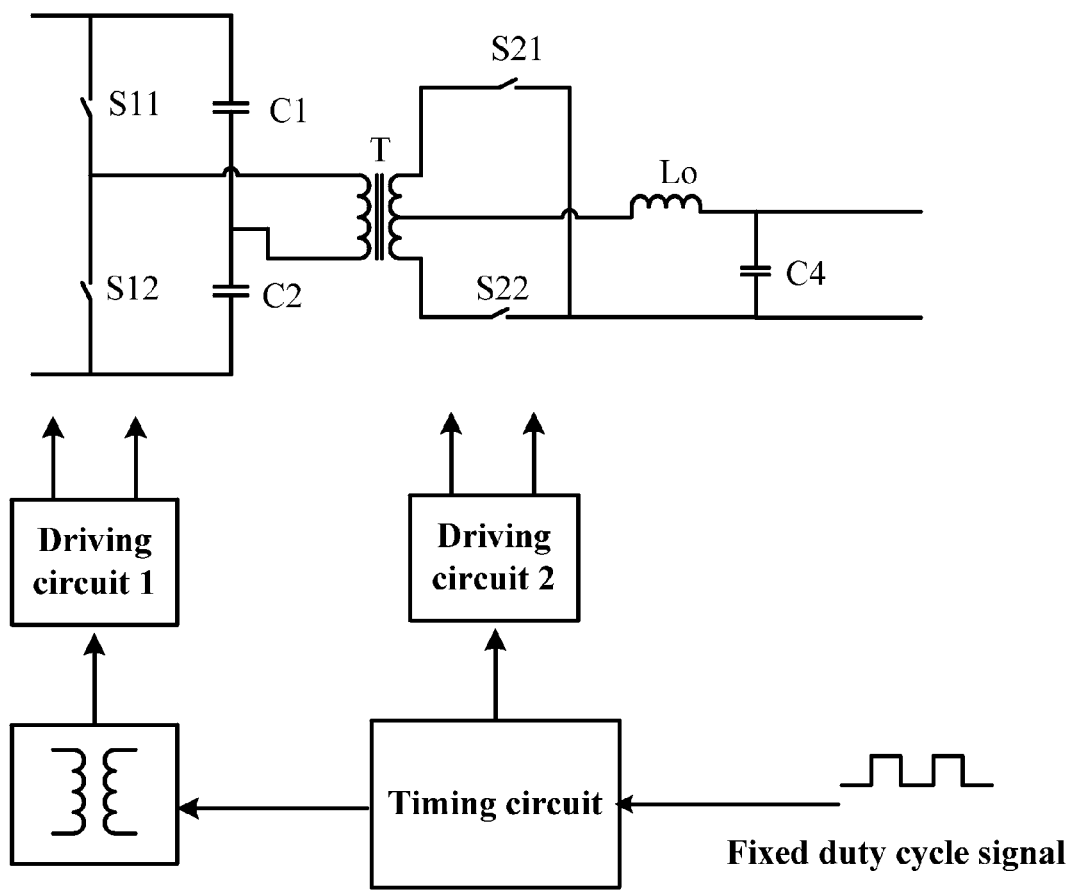
FIG. 3 shows a schematic circuit diagram of a non-regulation intermediate bus converter in the related art.

Now the embodiments will be described more completely with reference to the drawings. However, the embodiments can be implemented in various forms, and shall not be interpreted to be limited to the embodiments explained herein. On the contrary, these embodiments are provided for making the present disclosure to be complete and intact, and for delivering the concept of the embodiments to the person skilled in the art completely. In the drawings, for clarity, thicknesses of areas and layers are exaggerated. In the drawings, the same reference signs indicate the same or similar parts, and thus the repeated depiction of them could be omitted.

In addition, the described features, structures or characters may be combined in one or more embodiments in any appropriate manner. In the following depiction, many specific details are provided for sufficient understanding of the embodiments of the present disclosure. However, the person skilled in the art could appreciate that the technical solutions of the present disclosure could be practiced without one or more elements in the specific details, or by adopting other methods, components, materials and the like. In other conditions, the known structures, materials or operations are not illustrated or described in detail for avoiding blurring respective aspects of the present disclosure.

Recently, the output voltage range for high power bus converter products having a low voltage and a high current is between 8-12V generally. In order to carry higher current at the secondary side, a synchronous rectification technology may be adopted in the intermediate bus converter, wherein, the active switches, called the synchronous rectifier, such as a power MOSFET can replace the diodes to be used as the rectifier.

Figure 4:
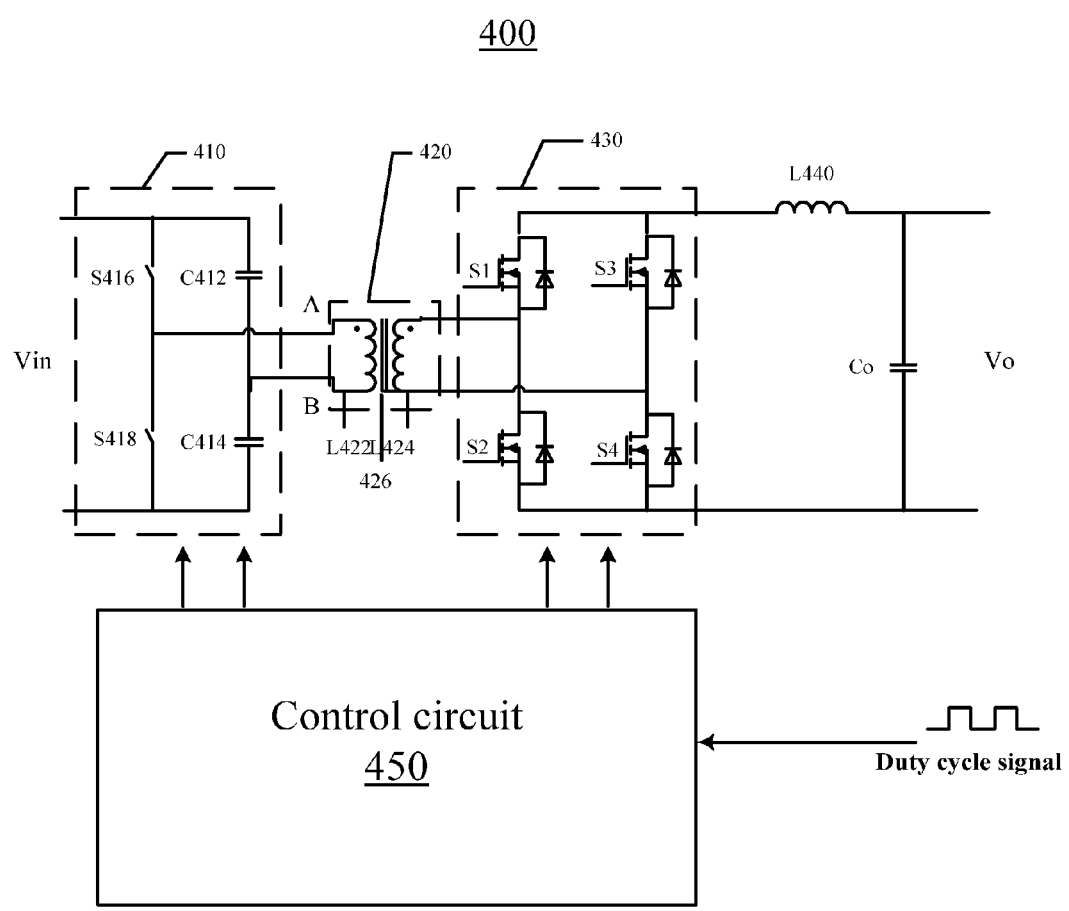
FIG. 4 shows a schematic circuit diagram of a DC to DC converter, in accordance with one embodiment of the present disclosure.

FIG. 4 shows a DC to DC converter 400, in accordance with an exemplary embodiment of the present disclosure. The DC to DC converter 400 includes a primary power circuit 410, a transformer 420, a secondary bridge synchronous rectifying circuit 430, an output inductor L440 and a control circuit 450. The transformer 420 includes a primary winding L422, a secondary winding L424 and a transformer core L426. The primary winding L422 and the secondary winding L424 may be, for example, PCB windings.

The primary power circuit 410 receives an input voltage Vin, and delivers a symmetrical power flow to a secondary side of the transformer 420 during a positive switching cycle and a negative switching cycle which are symmetrical. The magnetic flux in the transformer core 426 achieves a balance through the process of delivering the symmetrical power flow.

The primary power circuit 410 is illustrated as a half-bridge topology including a switch S416, a switch S418, a capacitor C412, and a capacitor C414.

Figure 6A:
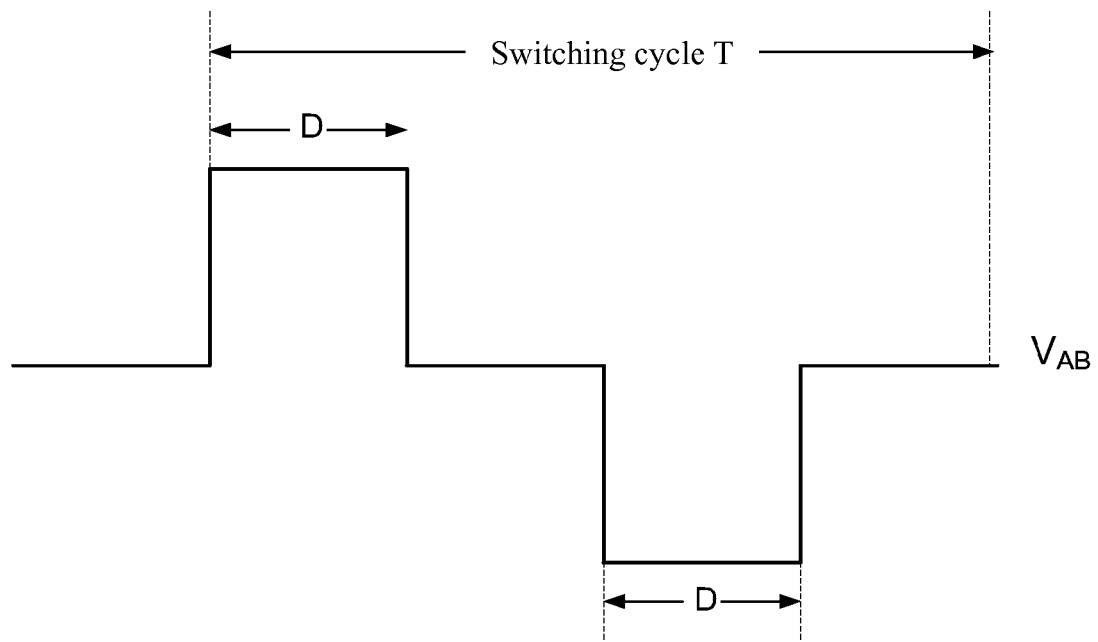
FIG. 6A shows a voltage waveform of a transformer primary winding in a DC to DC converter, in accordance with one embodiment of the present disclosure.

Specifically, the switch S416 has a first end electrically coupled to the input voltage Vin and a second end electrically coupled to a first end of the primary winding L422 of the transformer 420. The switch S418 has a first end which is electrically coupled to the second end of the switch S416. The capacitor C412 has a first end electrically coupled to the first end of the switch S416 and a second end electrically coupled to a second end of the primary winding L422. The capacitor C414 has a first end electrically coupled to the second end of the capacitor C412 and a second end electrically coupled to the second end of the switch S418. Third ends of the switch S416 and the switch S418 may be electrically coupled to a primary driving signal provided by the control circuit 450. The capacitor C412 and the capacitor C414 have a same capacitance value that is large enough to keep a constant voltage between two sides of the capacitor during a switching cycle. The capacitor C412 and the capacitor C414 may be used to provide a half input voltage as a reference to the primary winding L422 of the transformer. The two switches S416 and S418 in the primary power circuit 410 are turned on and off sequentially and alternatively depending on the primary driving signal provided by the control circuit 450, and thereby generate a bi-polarity and symmetrical voltage waveform between point A and point B (on the primary winding), as shown in FIG. 6A.

Although FIG. 4 illustrates the primary power circuit having the half-bridge circuit topology, the present disclosure is not limited thereto. The primary power circuit, for instance, may employ a full-bridge conversion circuit topology or a push-pull topology. If the full-bridge topology is employed, there is the corresponding need of changing the turn ratio of the transformer windings. To meet the requirement of push-pull topology, the transformer may include two primary windings. Overall, there is a similar result in the power loss of each topology, and these topologies could realize that the transformer deliver power flow in both positive switching cycle and negative switching cycle. Also, the total duty cycle of the transformer can be 2D, approximate to 100%.

The secondary bridge synchronous rectifying circuit 430 is electrically coupled to the secondary winding L424 of the transformer 420 for assisting the transformer 420 to deliver the power. The secondary bridge synchronous rectifying circuit 430 includes switches S1-S4. The first end of the switch S1 is electrically coupled to one end of the output inductor L440, and the second end of the switch S1 is electrically coupled to a first end of the secondary winding L424. The first end of the switch S2 is electrically coupled to the second end of the switch S1. The first end of the switch S3 is electrically coupled to the first end of the switch S1, and the second end of the switch S3 is electrically coupled to the second end of the secondary winding L424. The first end of the switch S4 is electrically coupled to the second end of the switch S3, and the second end of the switch S4 is electrically coupled to the second end of the switch S2. The third end of each switch S1-S4 (or called the control terminal) may be electrically coupled to the control circuit 450 for receiving the secondary driving signal provided by the control circuit 450.

Among these switches, the switches S1 and S4 are always turned on or turned off simultaneously, and the switches S2 and S3 are always turned on or turned off simultaneously. For instance, during the positive switching cycle, the switches S4 and S1 are continuously in an on-state, the switches S2 and S3 are continuously in an off-state, the secondary winding L424, the switch S1, the output inductor L440, the capacitor Co, and the switch S4 forms a close loop, and the power flow is delivered from the primary side to the secondary side; while during the negative switching cycle, the switches S2 and S3 are continuously in the on-state, the switches S4 and S1 are continuously in the off-state, the secondary winding L424 of the transformer, the switch S3, the output inductor L440, the capacitor Co, and the switch S2 forms a close loop, and the power flow is delivered from the primary side to the secondary side. One function of the output inductor L440 is to limit the peak power of delivering the power flow from the primary side to a load during the positive switching cycle and the negative switching cycle, and another function thereof is to keep the output current to be continuous when all the switches at the primary side are turned off and the power delivery from the primary side to the secondary side is ceased.

The control circuit 450 is configured to provide the primary driving signal for the primary power circuit 410 and the secondary driving signal for the secondary bridge synchronous rectifying circuit 430, respectively. In accordance with an exemplary embodiment, when the output voltage of the primary power circuit 410 is zero, the control circuit 450 may control all of the first switch S1, the second switch S2, the third switch S3, and the fourth switch S4 to be conductive. As mentioned above, it can be seen that if the switch S416 and the switch S418 in the primary power circuit 410 are both turned off, the switches S1~S4 in the secondary bridge synchronous rectifier 430 are all in the on-state, the current will not pass through the body diodes of respective switches, therefore, a great voltage drop of the body diode will not happen, and the conduction loss caused by the secondary bridge synchronous rectifier 430 is reduced, and the total conversion efficiency of the converter is enhanced.

Figure 5A:
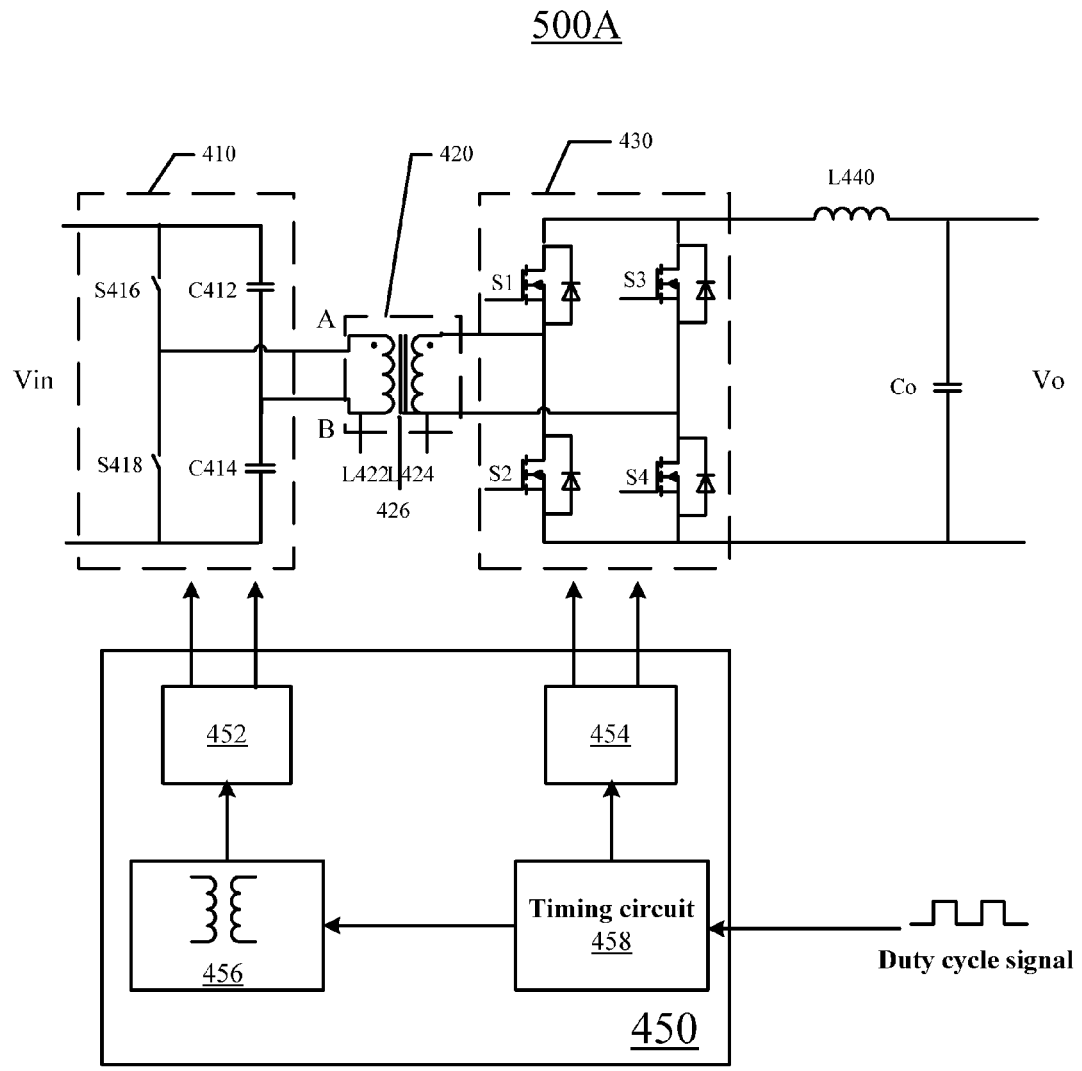
FIG. 5A shows a schematic circuit diagram of a DC to DC converter, in accordance with another embodiment of the present disclosure.

FIG. 5A shows a schematic circuit diagram of a DC to DC converter 500A including the control circuit 450, in accordance with an exemplary embodiment of the present disclosure.

Referring to the FIG. 5A, the control circuit 450 includes: a primary driving circuit 452 configured to output the primary driving signal; a secondary driving circuit 454 configured to output the secondary driving signal; an isolation circuit 456 configured to isolate the primary driving circuit 452 from the secondary driving circuit 454; and a timing circuit 458 that is electrically coupled to the secondary driving circuit 454 and is electrically coupled to the primary driving circuit 452 via the isolation circuit 456. The timing circuit 458 is configured to receive a duty cycle signal and arrange a signal timing between the primary driving signal and the secondary driving signal according to the duty cycle signal.

The duty cycle signal may be a fixed duty cycle signal generated by other circuits, or a variable duty cycle signal generated by, for instance, a voltage feedback control circuit. The signal isolation circuit 456 is used to keep an electrical isolation between the primary side and the secondary side. The signal isolation circuit 456 may be a magnetic transformer or a digital isolated IC, etc.

Figure 5B:
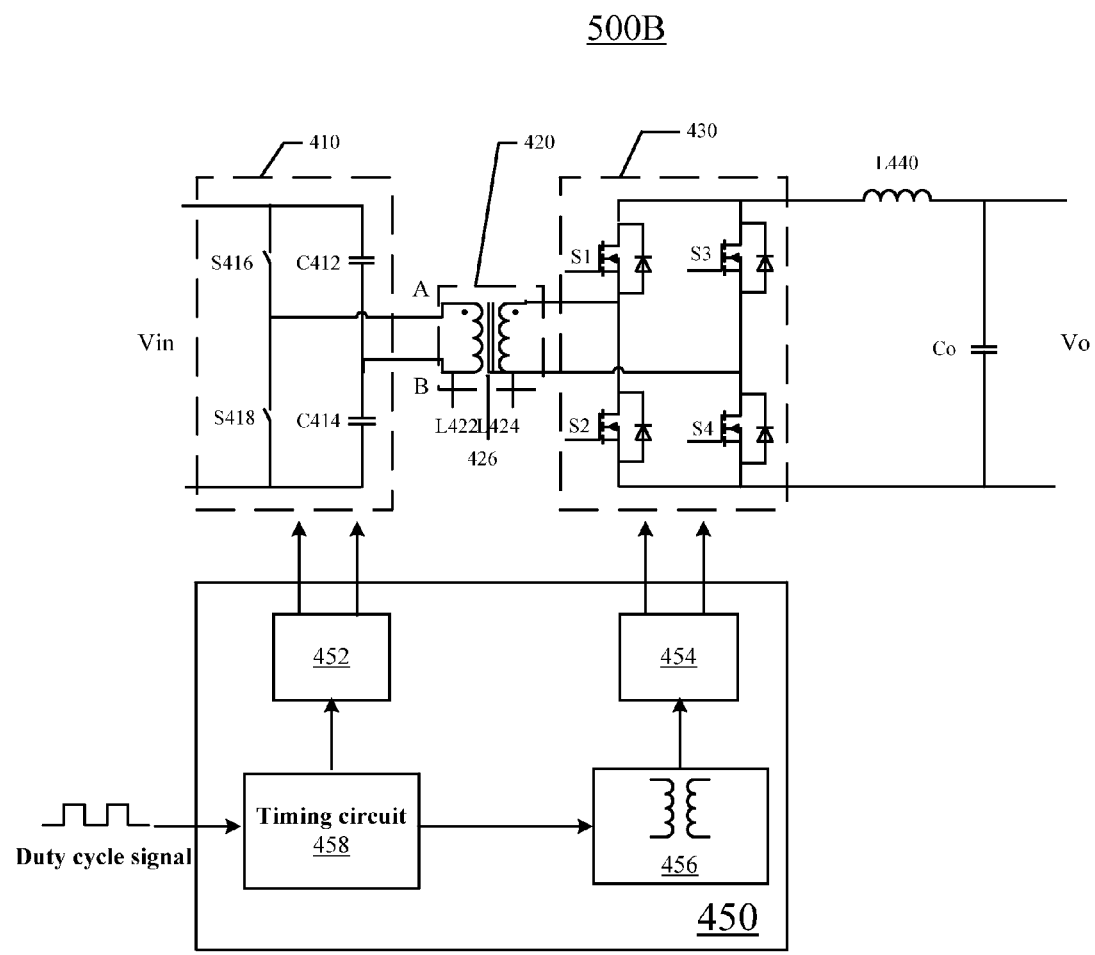
FIG. 5B shows a schematic circuit diagram of a DC to DC converter, in accordance with another embodiment of the present disclosure.

FIG. 5B shows a schematic circuit diagram of a DC to DC converter 500B including the control circuit 450, in accordance with an exemplary embodiment of the present disclosure. The control circuit 450 shown in the FIG. 5B is similar to that shown in the FIG. 5A, and the difference is that the timing circuit 458 is located at the primary side.

FIG. 6A shows a waveform of the primary winding voltage $V_{AB}$ of the transformer 420 illustrated in the FIG. 4. During a first turn-on cycle (a positive switching cycle) of a switching cycle T, $V_{AB}$ keeps a positive high level and has a duty cycle D. During a second turn-on cycle (a negative switching cycle) of the switching cycle T, $V_{AB}$ keeps a negative high level and also has the duty cycle D.

Figure 6B:
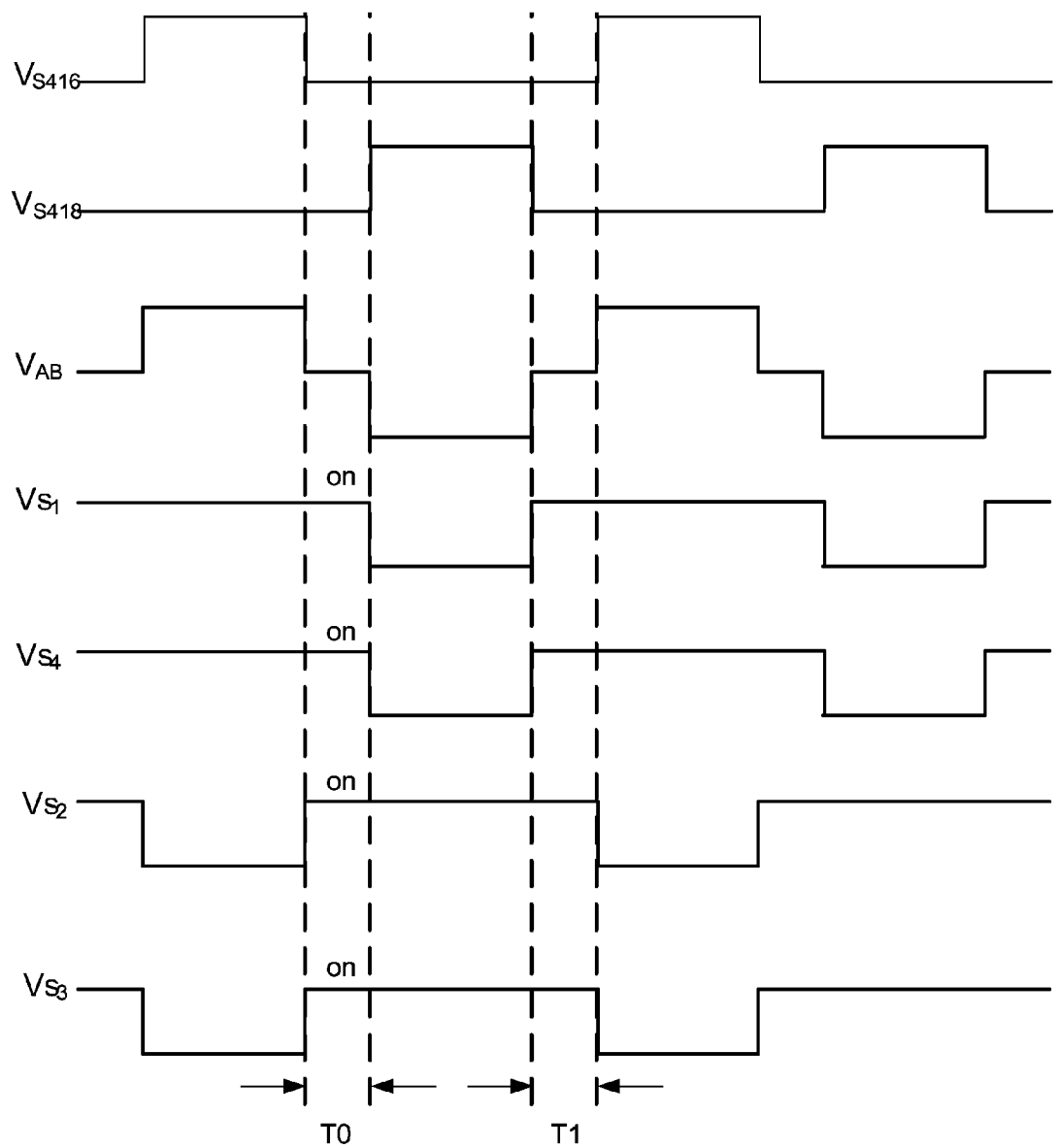
FIG. 6B shows waveforms of driving signals in a DC to DC converter, in accordance with one embodiment of the present disclosure.

FIG. 6B shows timing waveforms of the driving signals in the transformer 420 illustrated in the FIG. 4. The switches S1 and S4 correspond to the positive switching cycle, whereas the switches S2 and S3 correspond to the negative switching cycle. The driving signals of synchronous rectifiers S1-S4 may be almost synchronous with the driving signals of primary switches S416 and S418. Nevertheless, unlike the prior art, during the time periods (T0 and T1) in which the primary switches S416 and S418 are turned off, the switches S1, S4, and switches S2, S3 are turned on. In the time periods T0 and T1, no power flow is delivered from the primary side, while the switches S1, S2, S3, and S4 are all turned on so as to deliver the output current to the output inductor L440.

During the time periods in which the primary switches S416 and S418 are turned off, the secondary side of the power converter provides a freewheeling current because of the existence of inductor Lo According to the prior art, in the freewheeling current loop, when the switches S1 and S4 are in the on-state, the switches S2 and S3 are in the off-state; therefore the current flows through the body diodes of the switches S2 and S3, which results in a greater loss. Additionally, when the switches S2 and S3 are in the on-state, the switches S1 and S4 are in the off-state, the current flows through the body diodes of the switches S1 and S4, which results in a greater loss. Moreover, the poor reverse recovery characteristic of the body diode of the synchronous rectifier usually significantly impacts the efficiency of the converter.

The circuit topologies illustrated in the FIGS. 4, 5A and 5B, and the timing configuration illustrated in the FIG. 6 can make the converter to deliver power flow during both the positive switching cycle (namely, the first turn-on cycle) and the negative switching cycle (namely, the second turn-on cycle). The range of duty cycle D may be 0-50% theoretically. In fact, since the devices have a dead zone or a time delay, the maximum value of the duty cycle D is a little bit lower than 50%; for instance, it could be 48% or 49%. The symmetry of waveform V allows the magnetic flux in the transformer core to keep balance automatically.

As mentioned above, if the switches S1, S2, S3, and S4 are turned off, or are not turned on during the period in which the switches at the primary side are turned off, the converter 400, 500A and 500B are still workable, since the output current will flow through the body diodes of the synchronous rectifiers S1-S4. However, the voltage drop of the body diodes is about 0.5V-1V, which is much higher than the voltage drop when the synchronous rectifiers S1-S4 are turned on. As a result, in the present disclosure, it is possible to improve the efficiency of the converter by a precise timing control between the primary switches S416 and S418 and the synchronous rectifiers S1-S4.

The precise timing control between the primary switches S416 and S418 and the synchronous rectifiers S1-S4 is achieved by the timing circuit. In order to ensure the switches S1, S4 and S2, S3 to be in the on-state during the period in which the primary switches S416 and S418 are both in the off-state, the switches S1 and S4 are needed to be turned on at a time advanced by T1 before the primary switch S416 is turned on, and to be turned off at a time delayed by T0 after the primary switch S416 is turned off; meanwhile, the switches S2 and S3 are needed to be turned on at a time advanced by T0 before the primary switch S418 is turned on, and to be turned off at a time delayed by T1 after the primary switch S418 is turned off. It can be implemented by using the digital control approach or the analog control approach to arrange the timing relationships between the synchronous rectifier and the primary and secondary switches. For example, the duration of T1 and T0 may be set by using the analog control approach (adding extra resistors having appropriate resistance value). Alternatively, the duration of T1 and T0 may be set directly by using the digital control approach. Moreover, by using the digital control technology, the driving signals of the switches S1, S4 and the primary switch S418 can be set to have a complementary logic relation, and the driving signals of the switches S2, S3 and the primary switch S416 also have a complementary logic relation. Compared with the analog control approach, the digital control approach is more simple and flexible.

Recently, with a rapid development in the semiconductor technology, there is a fast growth in the characteristic and performance of MOSFET. But the technical improvement in the magnetic components is slow, and there is still no significant result in reducing the loss of magnetic core. Also, the PCB winding loss cannot be declined significantly. Hence, to achieve overall the reduction in the consumption of DC to DC converter, it is very important to know how to reduce the loss of transformer windings. The transformer described in the present disclosure has only one secondary winding, and then the current at the transformer secondary side flows through the secondary winding totally, which significantly increases the utilization of the transformer windings, and reduces the conduct impedance in the transformer secondary winding. This method not only declines the number of winding terminals, but also shortens the power delivery distance and decreases the loop inductance value, thereby finally declines the loss of transformer windings.

With regard to the configuration shown in FIG. 4, the synchronous rectifiers S1-S4 endure a much lower voltage stress than that of the related art. If the output voltage is indicated by $V_O$, the voltage stress $V_{DS}$ of the synchronous rectifiers S1-S4 can be expressed as:

$$V_{DS}=V_O/(2*D) \tag{1}$$

With regard to the intermediate bus transformer with $V_O$=12V, the value of D is designed to from 30% to 50%, and the maximum value of $V_{DS}$ is only 20V. Considering the high frequency voltage spike on the synchronous rectifiers S1-S4, the device having a voltage rating 30V may be used in this configuration. However, in the related art design, the device having a voltage rating 60V is needed to ensure the enough voltage margin. Under this condition, the conduction loss of the synchronous rectifiers may increase due to a lot of devices in the current loop. If the on-resistance of single synchronous rectifier is indicated by $R_{Ds-on}$, and the output current is indicated by $I_O$, the conduction loss $P_{loss}$ of the synchronous rectifier can be expressed as:

$$P_{loss}=2*I_O^2*R_{DS-on} \tag{2}$$

The scaling factor 2 in the equation (2) means the output current flows through both two rectifiers at the same time. However, the parameter $R_{Ds-on}$ of most MOSFETs depends on the maximum breakdown voltage between the drain and the source of the MOSFET. The lower the maximum breakdown voltage is, the lower the $R_{Ds-on}$ may be achieved.

Table 1 shows the parameters of some devices from a MOSFET manufacture A. For the same device packaging and similar size of semiconductor die, the on-resistance $R_{Ds-on}$ of 30V/40V MOSFET is only ⅓ to ¼ of that of 60V/80V MOSFET. If two 30V MOSFETs in series connections are employed, its power loss is almost the same as that if two 60V MOSFETs in parallel connection are employed. Table 1 also shows the parameter Qrr, which represents the characteristic of reverse recovery of the body diode. The lower the parameter Qrr is, the lower the reverse recovery loss is.

TABLE 1

| | Manufacturer A Device Number | | | |
|---|---|---|---|---|
| | BSC047N08NS3 G | BSC038N06NS | BSC014N04LSI | BSC011N03LSI |
| $V_{ds}$ Voltage rating | 80 V | 60 V | 40 V | 30 V |
| $R_{ds-on}$ | 4.7 mohm | 3.9 mohm | 1.4 mohm | 1.1 mohm |
| Qrr | 109 nC | 28 nC | 20 nC | 5 nC |

Another factor of impacting the reverse recovery loss is the current change slew rate di/dt. In the synchronous rectifiers, faster di/dt results in a higher reverse recovery loss. The value of di/dt depends on a leakage inductance $L_{leakage}$ of the transformer. For the configuration in the FIG. 4, di/dt can be expressed as:

$$di/dt = \frac{1}{2}V_{IN}/L_{leakage}$$

$V_{IN}$ represents the input voltage, and the factor ½ comes from the half-bridge topology. If a high Qrr device is used as the synchronous rectifier, the leakage inductance $L_{Leakage}$ cannot be designed too small, since the higher di/dt will result in the greater reverse recovery loss. On the other hand, the large leakage inductance $L_{Leakage}$ will cause parasitic power loss in the transformer, and the parasitic power loss may be roughly expressed as:

$$P_{leakage} = \frac{1}{2} * I_P^2 * L_{leakage}$$

Wherein Ip represents the current at the transformer primary side, if it is assumed that $L_{Leakage}$ is a leakage inductance from the transformer primary side.

If a low Qrr device is used as the synchronous rectifier, the power loss may be reduced and a better overall efficiency is achieved. The leakage inductance of the converter may be designed as small as possible, while the reverse recovery loss will not increase too much.

Figure 7A:
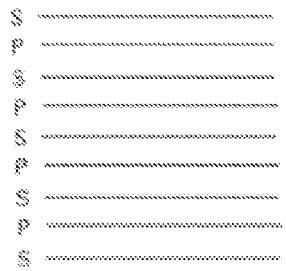
FIGS. 7A, 7B, 7C show a layout of PCB windings of the transformer, which can minimize a leakage inductance between the primary winding and the secondary winding, in a DC to DC converter, in accordance with one embodiment of the present disclosure.
Figure 7B:
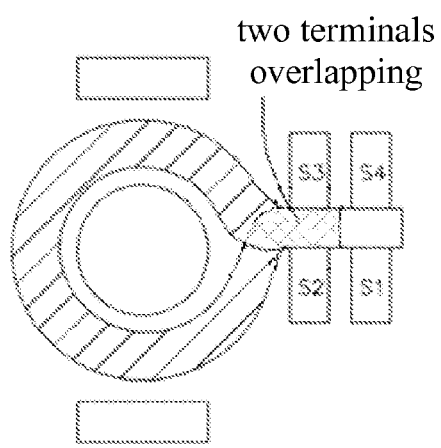
Figure 7C:
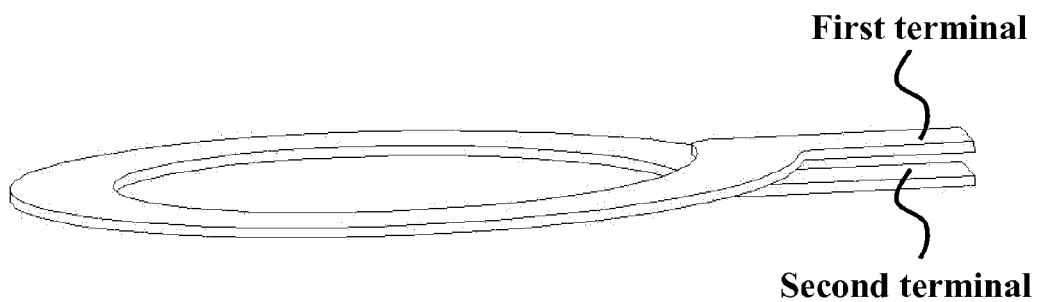

FIGS. 7A-7C illustrate a structure that declines the leakage inductance between the transformer primary side and secondary side. As shown in the FIG. 7A, the layers of the primary winding P and the layers of the secondary winding S are arranged to be interleaved. In most case, the primary winding P has multiple turns, therefore, the layers of the primary winding P may be connected in series, while the secondary winding S has less turns, even one turn, therefore, the layers of the secondary winding S may be connected in parallel. Referring to the FIG. 7A, in the full-interleave configuration, the leakage inductance is minimum. Nevertheless, if the capacitance value between the transformer primary side and the secondary side is too large, a further compromise process may be adopted.

In the configuration shown in FIG. 4, the transformer secondary side has only two connection terminals corresponding to single secondary winding. Because of high current in the secondary side, the connection terminals in the secondary side are important for reducing the transformer conduction loss and the leakage inductance loss. It is easy to dispose two terminals in the space, and the two terminals of the secondary winding may be at least partially overlapped. The layout, in which two terminals are at least partially overlapped outside the transformer primary winding area, is shown in FIG. 7B and FIG. 7C. Since current direction flowing through the two terminals of the secondary winding is opposite, the magnetic flux caused by the current may be cancelled out, and both the conduction loss of the terminals of the secondary winding and the leakage inductance loss of the transformer will be reduced.

Figure 8:
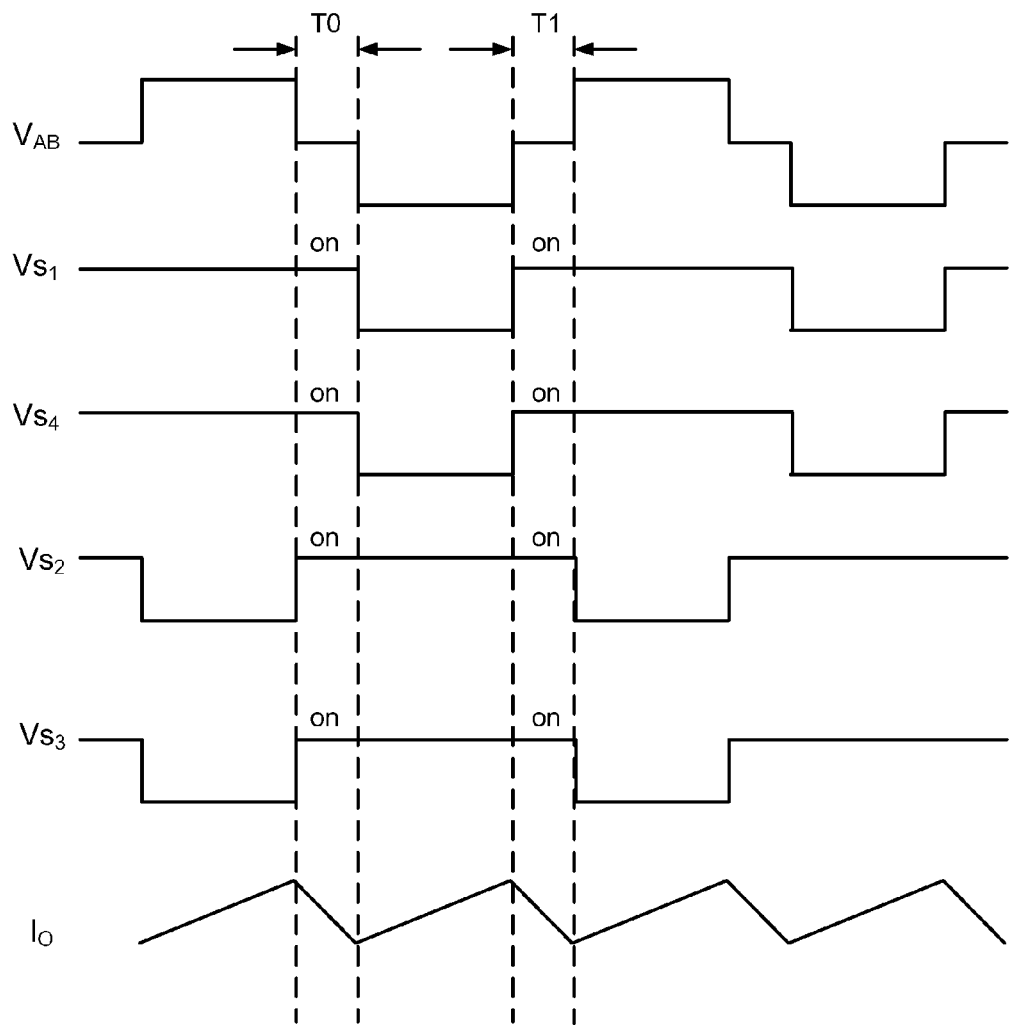
FIG. 8 shows current waveforms of the output inductor in a DC to DC converter, in accordance with one embodiment of the present disclosure.

FIG. 8 shows the waveforms of the current flowing through the inductor L440. During the positive switching cycle, $V_{AB}$ represents a positive high level, the switches S1 and S4 are turned on to deliver power to the load, and the output current increases linearly. When the power delivery is ceased during the positive switching cycle, the switches S1 and S4 are kept in the on-state, and the switches S2 and S3 are turned on, thus the current flows through the switches S1, S2, S3, and S4 instead of flowing through the respective body diodes, and the current decreases linearly in this period.

When the negative switching cycle starts, $V_{AB}$ changes to a negative high level, and the switches S1 and S4 are turned off, thus the power is delivered to the inductor L440 through the switches S2 and S3, and the output current increases linearly again. When the power delivery is ceased during the negative switching cycle, and the switches S1 and S3 are turned on, the current directly flows through the switches S1, S2, S3, and S4 instead of flowing through the respective body diodes, and the current decreases linearly in this period.

If the output inductor has a large inductance value, the change ΔIo of the output current will be smaller based on an equation as follows:

$$\Delta I_o = \frac{V_o * T_s * (1 - 2 * D)}{L_o}$$

Wherein $V_O$ represents the output voltage and $T_s$ represents the duration of the switching cycle. The output inductor $L_O$ with large inductance value can help to reduce the RMS current in the primary side and secondary side, and then reduce the conduction loss in the primary side and secondary side. However, the output inductor $L_O$ with large inductance value may also result in its own larger power loss. Thus, the inductance value of inductor $L_O$ needs to be chosen for reducing the overall power loss.

In some applications, the bus voltage, that is the output voltage of the intermediate bus converter, may be unnecessary tot be regulated to an accurate range because the successive point of load (POL) has the capability to meet the input voltage with a certain range. The duty cycle D may be limited to a small range, or even be set as a constant, approximately 50%. Therefore, the inductor $L_O$ may select a very small value, which will not cause a high current ripple $\Delta I_O$.

Figure 9:
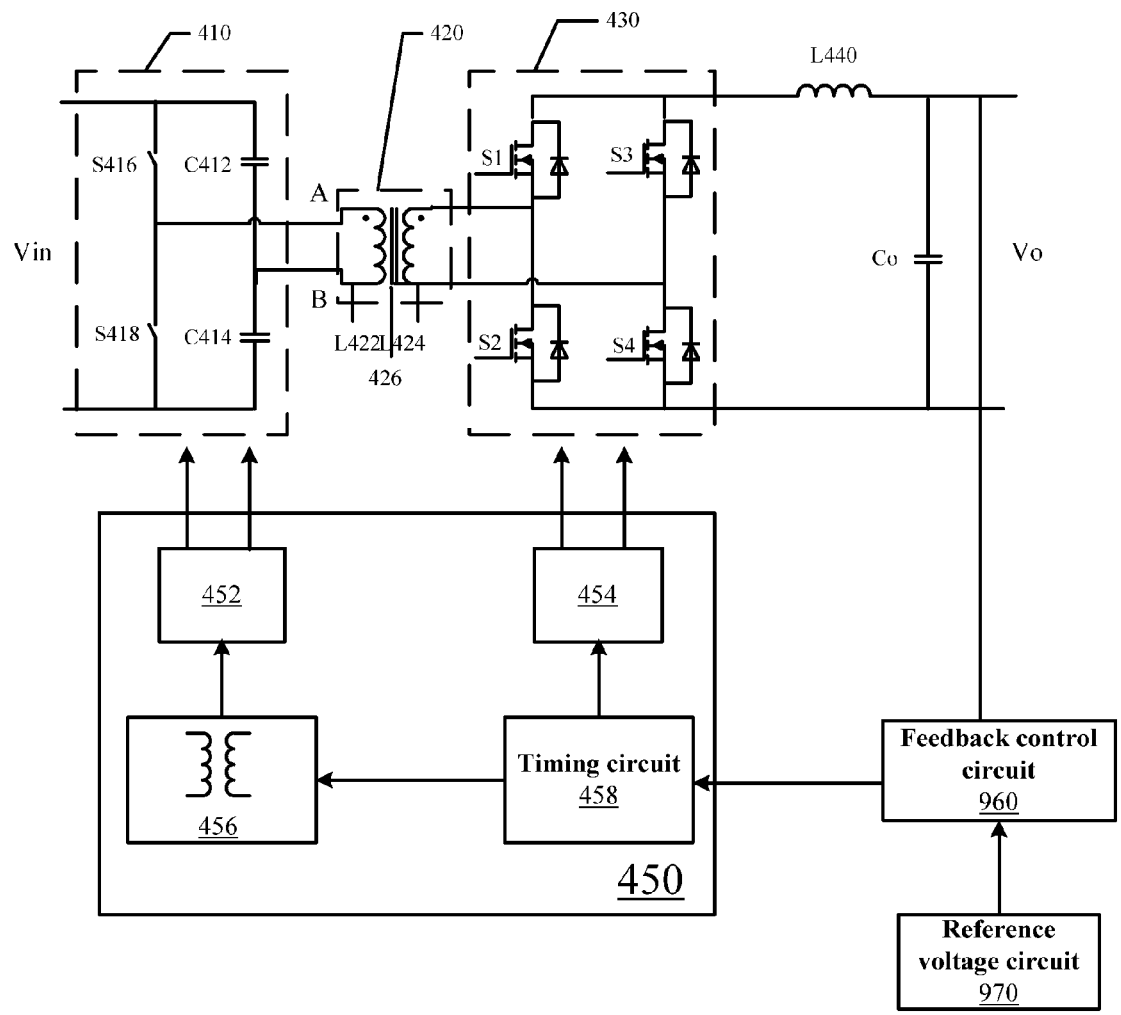
FIG. 9 shows a schematic circuit diagram of a DC to DC converter with a regulation by a voltage feedback control circuit, in accordance with one embodiment of the present disclosure.

The diagram of the regulated intermediate bus converter 900 is shown in FIG. 9. The regulated intermediate bus converter 900 may be similar to the converter 400 illustrated in the FIG. 4, except for a feedback control circuit 960 and a reference voltage circuit 970. Thus, for a conciseness, it needs not repeat the similar part with the converter 400.

In order to regulate the output voltage, the feedback control circuit 960 is employed. In addition, the reference voltage circuit 970 is also employed to generate a reference voltage which does not vary with the input voltage and the output voltage. The feedback control circuit 960 receives the output voltage signal $V_O$, and then compares the output voltage signal $V_O$ with the reference voltage $V_{ref}$ to generate the duty cycle signal. The duty cycle signal is transmitted to the timing circuit 458, and further transmitted to the driving circuits 452 and 454 after being processed by the timing circuit 458. The driving circuits 452 and 454 output the primary driving signal applied to the switches S416 and S418 in the primary side and the secondary driving signal applied to the synchronous rectifiers S1-S4 in the secondary side. The output voltage may be controlled as the reference voltage.

Figure 10:
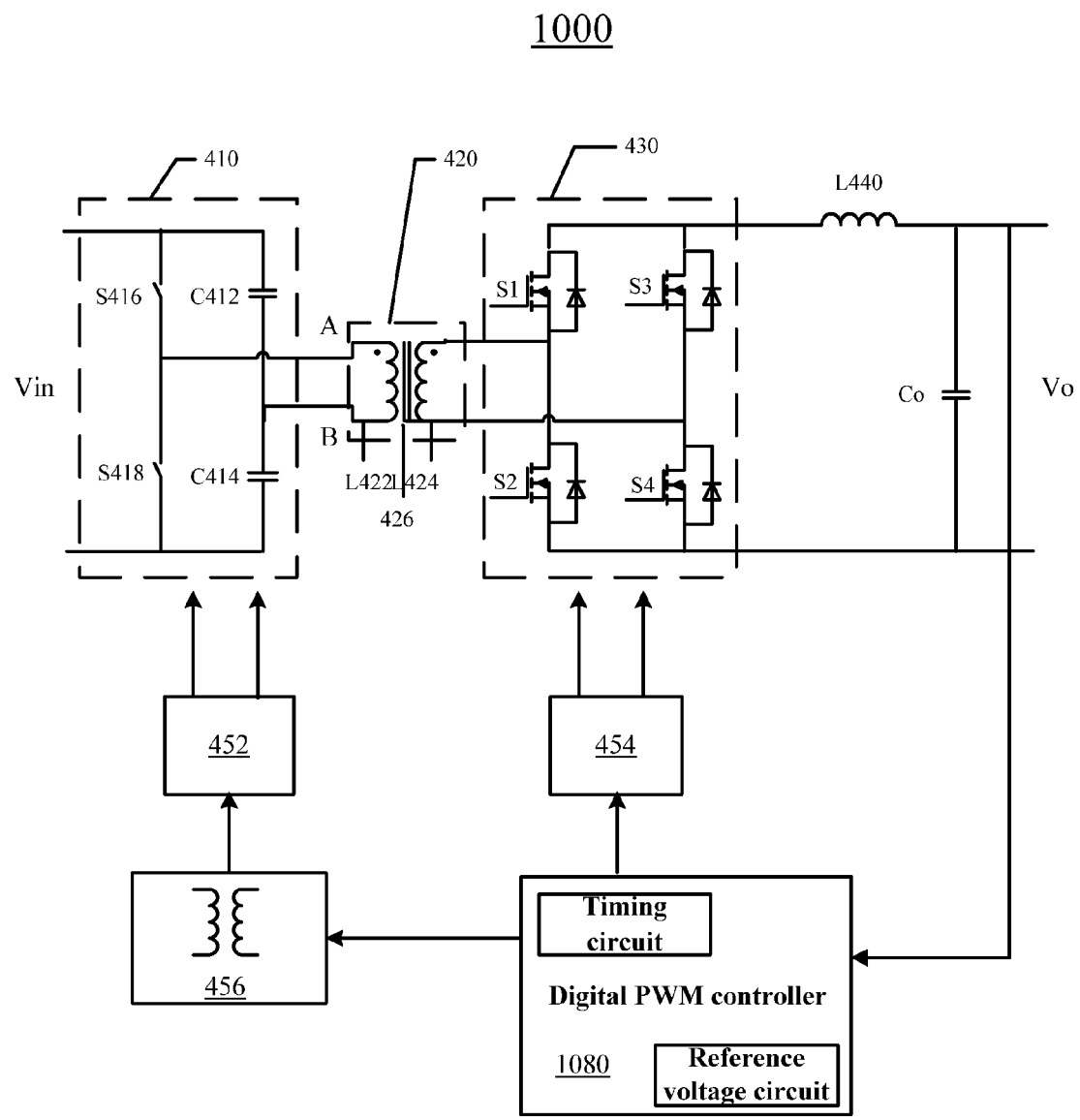
FIG. 10 shows a schematic circuit diagram of a DC to DC converter with a regulation by a digital pulse-width modulation (PWM), in accordance with one embodiment of the present disclosure.

FIG. 10 shows the diagram of a converter 1000 having a digital PWM controller 1080. The digital PWM controller, also called a microprocessor or MCU, etc., is an integrated circuit that has a high density and a flexible function. In general, the digital PWM controller includes programmable firmware. It is easy to realize different circuit functions by implementing different firmware. Once the digital PWM controller is introduced, many circuit units may be integrated into the digital PWM controller. The timing circuit may be integrated using the firmware or hardware of the digital PWM controller. The reference voltage circuit may also be integrated by an internal reference voltage of the controller or by the firmware. For example, the timing of driving signals may be set through the firmware of the PWM controller; and the reference voltage may be set through the firmware of the digital PWM controller. If there are other considerations, these circuit units may also be arranged outside the digital PWM controller. Other parts of the converter 1000 are similar to the converter shown in the FIG. 4 or FIG. 9.

The DC to DC power converter, as the DC/DC power conversion stage, is described in the present disclosure, which may be applied in some complicated power systems to improve overall power conversion efficiency.

Figure 11:
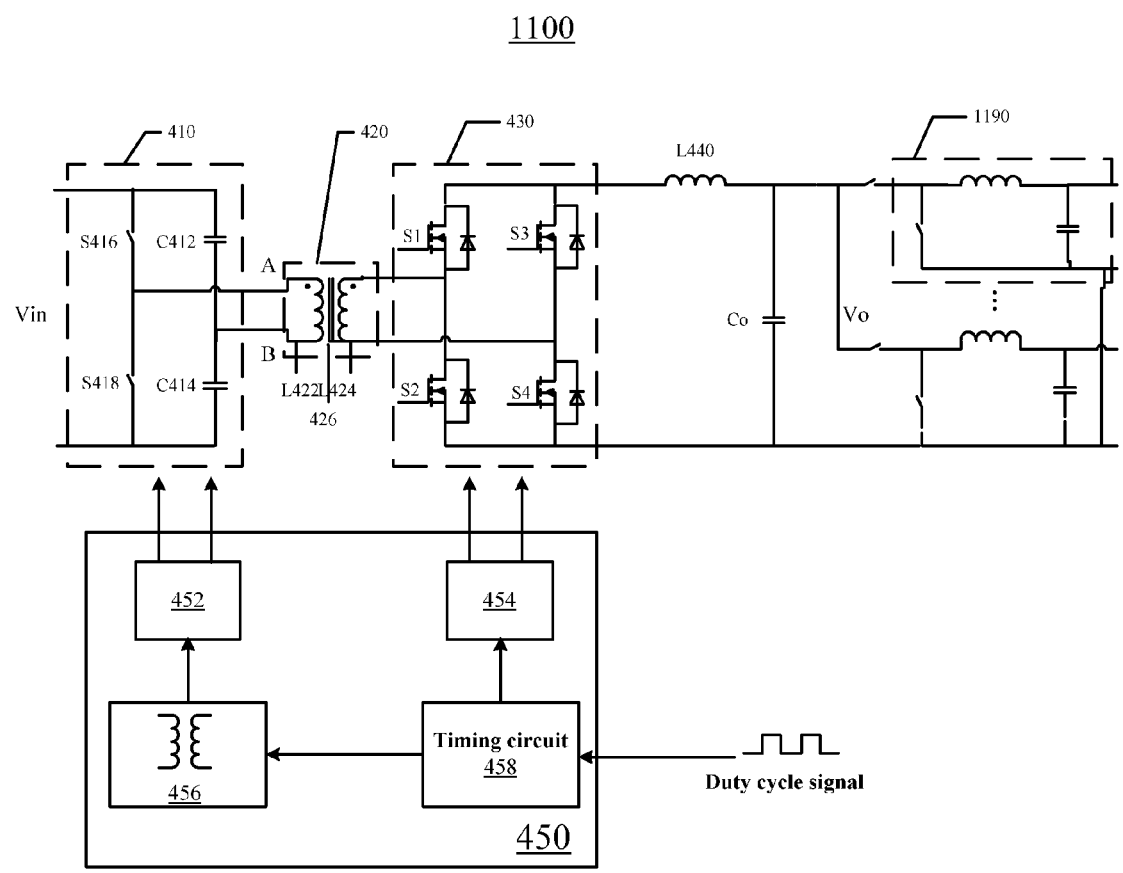
FIG. 11 shows a schematic circuit diagram of a DC to DC conversion system with multiple outputs, in accordance with one embodiment of the present disclosure.

FIG. 11 shows the schematic circuit diagram of DC to DC conversion system 1100 which provides multiple output voltages. The DC to DC conversion system 1100 may adopt the converter 400 illustrated in the FIG. 4, the converter 500A illustrated in the FIG. 5A, the converter 500B illustrated in the FIG. 5B, the converter 900 illustrated in the FIG. 9, or the converter 1000 illustrated in the FIG. 10. The isolation converter of the present disclosure provides the electrical isolation, and converts the input voltage down to an appropriate voltage such that the non-isolated switching regulator 1190 electrically coupled to the output terminal of the DC to DC converter has an optimized efficiency. The input voltage of 5~7V, for instance, may be the best for an output voltage of 3.3V. The non-isolated switching regulator 1190 may be a single phase buck converter or a multi-phase buck converter. For the multi-phase buck converter, each phase has a phase shift, therefore, all or part of the input ripple current and output ripple current may be partially or totally cancelled out. The non-isolated switching regulator 1190 is configured to convert the output voltage of the DC to DC converter to one or more regulated voltage. The switching regulator 1190 may be a buck circuit.

Figure 12:
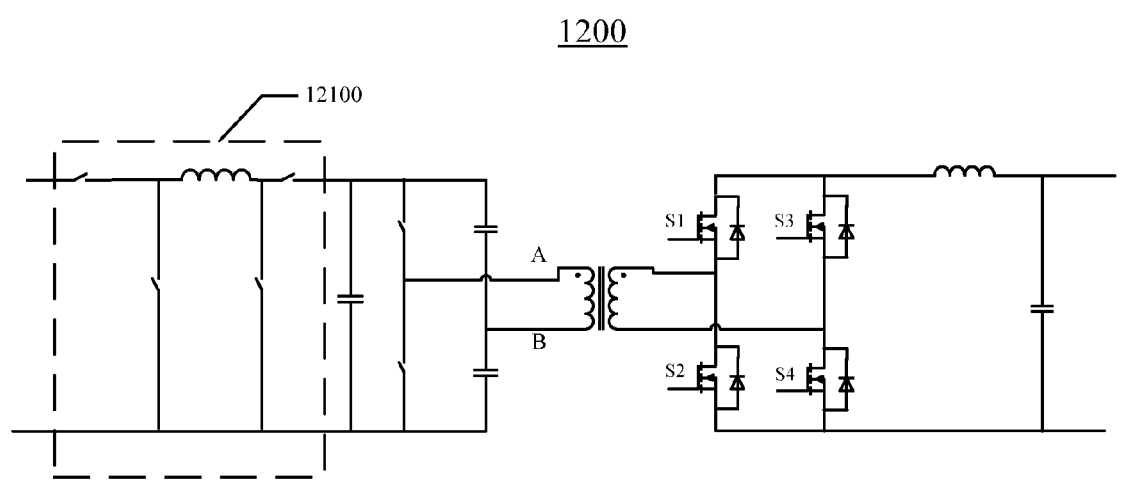
FIG. 12 shows a schematic circuit diagram of a DC to DC conversion system with a pre-regulated power stage, in accordance with one embodiment of the present disclosure.

FIG. 12 shows the schematic circuit diagram of a DC to DC conversion system 1200 which receives a very wide range of input voltage. The DC to DC conversion system 1200 may adopt the converter 400 illustrated in the FIG. 4, the converter 500A illustrated in the FIG. 5A, the converter 500B illustrated in the FIG. 5B, the converter 900 illustrated in the FIG. 9, or the converter 1000 illustrated in the FIG. 10. The buck-boost circuit 12100 is arranged prior to the isolation converter according to the present disclosure, such that the input voltage may be pre-adjusted to an appropriate range for the isolation converter. The isolation converter may operate in the non-regulated mode to achieve higher conversion efficiency, or the isolation converter may operate in the regulation mode at least under certain input voltages so as to relief the burden of the buck-boost circuit 12100.

While the present disclosure has been described in terms of the exemplary embodiments, it is understood that such disclosure is not to be interpreted as limiting. Various alternations and modifications will no doubt become apparent to those skilled in the art after reading the above disclosure. Accordingly, it is intended that the present disclosure be interpreted as covering all alternations, modifications, and equivalent arrangements as falling within the true spirit and scope of the appending claims.

What is claimed is:

1. A DC to DC converter, comprising:
    a transformer having a transformer core, a primary winding electrically coupled to an output terminal of a primary power circuit and a secondary winding, wherein the primary power circuit is configured to receive an input voltage and deliver a power flow having a symmetrical voltage to a secondary side of the transformer during a positive switching cycle and a negative switching cycle generated on the primary winding, and a magnetic flux in the transformer core is balanced through the power flow having the symmetrical voltage;
    an output inductor;
    a secondary bridge synchronous rectifying circuit electrically coupled to the secondary winding of the transformer, comprising:
        a first switch having a first end electrically coupled to one end of the output inductor, and a second end electrically coupled to a first end of the secondary winding;
        a second switch having a first end electrically coupled to the second end of the first switch;
        a third switch having a first end electrically coupled to the first end of the first switch, and a second end electrically coupled to a second end of the secondary winding; and
        a fourth switch having a first end electrically coupled to the second end of the third switch, and a second end electrically coupled to a second end of the second switch; and
    a control circuit configured to provide a primary driving signal for the primary power circuit and a secondary driving signal for the secondary bridge synchronous rectifying circuit, respectively, and when an output voltage of the primary power circuit is zero, the control circuit is configured to control the first switch, the second switch, the third switch and the fourth switch to be conductive,
    wherein the control circuit comprises:
        a primary driving circuit configured to output the primary driving signal;
        a secondary driving circuit configured to output the secondary driving signal;
        an isolation circuit configured to electrically isolate the primary driving circuit from the secondary driving circuit; and
        a timing circuit configured to receive a fixed duty cycle signal or a variable duty cycle signal, and arrange a signal timing between the primary driving signal and the secondary driving signal based on the received fixed duty cycle signal or variable duty cycle signal.

2. The DC to DC converter as recited in claim 1, wherein the first switch, the fourth switch and the secondary winding deliver the power flow to the secondary side of the transformer during the positive switching cycle, and the second switch, the third switch and the secondary winding deliver the power flow to the secondary side of the transformer during the negative switching cycle.

3. The DC to DC converter as recited in claim 1, wherein when the primary power circuit ceases delivering the power flow to the secondary side of the transformer, a current passing through the output inductor is continuous.

4. The DC to DC converter as recited in claim 1, wherein the primary winding and the secondary winding are PCB windings, and they are arranged to be interleaved.

5. The DC to DC converter as recited in claim 4, wherein the first end of the secondary winding includes a first terminal, the second end of the secondary winding includes a second terminal, and the first terminal and the second terminal are at least partially overlapped outside an area of the primary winding.

6. The DC to DC converter as recited in claim 4, wherein the secondary winding includes a plurality of PCB layers, and at least one part of the PCB layers is connected in parallel.

7. The DC to DC converter as recited in claim 1, wherein when the timing circuit receives the fixed duty cycle signal, an output voltage of the DC to DC converter is proportional to the input voltage.

8. The DC to DC converter as recited in claim 1, further comprising a feedback control circuit and a reference voltage circuit generating a reference voltage, wherein the feedback control circuit receives an output voltage of the DC to DC converter, and compares the output voltage with the reference voltage to generate the variable duty cycle signal to the timing circuit.

9. The DC to DC converter as recited in claim 8, wherein the timing circuit, the feedback control circuit and the reference voltage circuit are integrated into a digital pulse-width modulation controller, wherein the timing circuit generates the signal timing between the primary driving signal and the secondary driving signal by use of the digital pulse-width modulation controller.

10. The DC to DC converter as recited in claim 1, wherein the first switch, the second switch, the third switch and the fourth switch are MOSFETs.

11. The DC to DC converter as recited in claim 1, wherein the primary power circuit is a half-bridge conversion circuit or a full-bridge conversion circuit.

12. The DC to DC converter as recited in claim 1, wherein the primary power circuit comprises:
  a fifth switch having a first end electrically coupled to the input voltage, and a second end electrically coupled to a first end of the primary winding of the transformer;
  a sixth switch having a first end electrically coupled to the second end of the fifth switch;
  a first capacitor having a first end electrically coupled to the first end of the fifth switch, and a second end electrically coupled to the second end of the primary winding; and
  a second capacitor having a first end electrically coupled to the second end of the first capacitor, and a second end electrically coupled a second end of the sixth switch.

13. The DC to DC converter as recited in claim 1, wherein an output voltage of the DC to DC converter is equal to or smaller than 16 V.

14. A DC to DC conversion system, comprising:
  a DC to DC converter comprising:
    a transformer having a transformer core, a primary winding electrically coupled to a primary power circuit and a secondary winding, wherein the primary power circuit is configured to receive an input voltage, and deliver a power flow having a symmetrical voltage to a secondary side of the transformer during a positive switching cycle and a negative switching cycle generated on the primary winding, a magnetic flux in the transformer core is balanced through the power flow having the symmetrical voltage;
    an output inductor;
    a secondary bridge synchronous rectifying circuit electrically coupled to the secondary winding of the transformer, comprising:
      a first switch having a first end electrically coupled to one end of the output inductor, and a second end electrically coupled to a first end of the secondary winding;
      a second switch having a first end electrically coupled to the second end of the first switch;
      a third switch having a first end electrically coupled to the first end of the first switch, and a second end electrically coupled to a second end of the secondary winding; and
      a fourth switch having a first end electrically coupled to the second end of the third switch, and a second end electrically coupled to a second end of the second switch; and
    a control circuit configured to provide a primary driving signal for the primary power circuit and a secondary driving signal for the secondary bridge synchronous rectifying circuit, respectively, and when an output voltage of the primary power circuit is zero, the control circuit is configured to control the first switch, the second switch, the third switch and the fourth switch to be conductive; and
  a non-isolated switching regulator electrically coupled to an output terminal of the DC to DC converter, and configured to convert the input voltage of the DC to DC converter into one or more regulated voltages,
  wherein the control circuit comprises:
    a primary driving circuit configured to output the primary driving signal;
    a secondary driving circuit configured to output the secondary driving signal;
    an isolation circuit configured to electrically isolate the primary driving circuit from the secondary driving circuit; and
    a timing circuit configured to receive a fixed duty cycle signal or a variable duty cycle signal, and arrange a signal timing between the primary driving signal and the secondary driving signal based on the received fixed duty cycle signal or variable duty cycle signal.

15. The DC to DC conversion system as recited in claim 14, wherein the switching regulator is a buck circuit.

16. The DC to DC conversion system as recited in claim 14, wherein the primary winding and the secondary winding are PCB windings, and they are arranged to be interleaved.

17. The DC to DC conversion system as recited in claim 16, wherein the first end of the secondary winding includes a first terminal, the second end of the secondary winding includes a second terminal, and the first terminal and the second terminal are at least partially overlapped outside an area of the primary winding.

18. A DC to DC conversion system, comprising:
  a DC to DC converter comprising:
    a transformer having a transformer core, a primary winding electrically coupled to an output terminal of a primary power circuit and a secondary winding, wherein the primary power circuit is configured to receive an input voltage, and deliver a power flow having a symmetrical voltage to a secondary side of the transformer during a positive switching cycle and a negative switching cycle generated on the primary winding, a magnetic flux in the transformer core is balanced through the power flow having the symmetrical voltage;
    an output inductor;
    a secondary bridge synchronous rectifying circuit electrically coupled to the secondary winding of the transformer, comprising:
      a first switch having a first end electrically coupled to one end of the output inductor, and a second end electrically coupled to a first end of the secondary winding;
      a second switch having a first end electrically coupled to the second end of the first switch;
      a third switch having a first end electrically coupled to the first end of the first switch, and a second end electrically coupled to a second end of the secondary winding; and
      a fourth switch having a first end electrically coupled to the second end of the third switch, and a second end electrically coupled to a second end of the second switch; and
    a control circuit configured to provide a primary driving signal for the primary power circuit and a secondary driving signal for the secondary bridge synchronous rectifying circuit, respectively, and when an output voltage of the primary power circuit is zero, the control circuit is configured to control the first switch, the second switch, the third switch and the fourth switch to be conductive; and a non-isolated switching regulator electrically coupled to an input terminal of the DC to DC converter, wherein the control circuit comprises:

a primary driving circuit configured to output the primary driving signal;

a secondary driving circuit configured to output the secondary driving signal;

an isolation circuit configured to electrically isolate the primary driving circuit from the secondary driving circuit; and a timing circuit configured to receive a fixed duty cycle signal or a variable duty cycle signal, and arrange a signal timing between the primary driving signal and the secondary driving signal based on the received fixed duty cycle signal or variable duty cycle signal.

19. The DC to DC conversion system as recited in claim 18, wherein the switching regulator is a buck-boost circuit.

20. The DC to DC conversion system as recited in claim 18, wherein the primary winding and the secondary winding are PCB windings, and they are arranged to be interleaved.

21. The DC to DC conversion system as recited in claim 20 wherein the first end of the secondary winding includes a first terminal, the second end of the secondary winding includes a second terminal, and the first terminal and the second terminal are at least partially overlapped outside an area of the primary winding.

* * * * *